United States Patent
Brendel et al.

(10) Patent No.: US 9,524,432 B1
(45) Date of Patent: Dec. 20, 2016

(54) FAST INTEREST POINT EXTRACTION FOR AUGMENTED REALITY

(71) Applicant: A9.com, Inc., Palo Alto, CA (US)

(72) Inventors: William Brendel, San Francisco, CA (US); Nityananda Jayadevaprakash, San Jose, CA (US); David Creighton Mott, Los Altos, CA (US); Jie Feng, New York, NY (US)

(73) Assignee: A9.com, Inc., Palo Alto, CA (US)

( * ) Notice: Subject to any disclaimer, the term of this patent is extended or adjusted under 35 U.S.C. 154(b) by 242 days.

(21) Appl. No.: 14/313,466

(22) Filed: Jun. 24, 2014

(51) Int. Cl.
*G06K 9/00* (2006.01)
*G06T 7/40* (2006.01)

(52) U.S. Cl.
CPC .......... *G06K 9/00523* (2013.01); *G06T 7/408* (2013.01); *G06T 2207/10024* (2013.01)

(58) Field of Classification Search
CPC .............. G06T 7/408; G06K 9/00496–9/0057
See application file for complete search history.

(56) References Cited

U.S. PATENT DOCUMENTS

| | | | | |
|---|---|---|---|---|
| 8,953,893 B2* | 2/2015 | Zeng | ..................... | G06K 9/4638 382/195 |
| 2002/0057838 A1* | 5/2002 | Steger | ................... | G06K 9/6203 382/197 |
| 2008/0060034 A1* | 3/2008 | Egnal | ..................... | G01C 11/02 725/105 |
| 2009/0324087 A1* | 12/2009 | Kletter | ................. | G06K 9/4671 382/195 |
| 2011/0286631 A1* | 11/2011 | Wagner | ..................... | G06K 9/32 382/103 |
| 2013/0089261 A1* | 4/2013 | Sung | ..................... | G06K 9/4604 382/199 |
| 2013/0322761 A1* | 12/2013 | Zeng | ..................... | G06K 9/4638 382/195 |
| 2013/0322763 A1* | 12/2013 | Heu | ......................... | G06T 7/004 382/195 |
| 2014/0226906 A1* | 8/2014 | Kang | ..................... | G06K 9/6211 382/197 |

(Continued)

OTHER PUBLICATIONS

Rosten et al "Real Time Video annotations for augmented reality" ISVC 2005.*
Mustafa Ozuysal et al., "Fast Keypoint Recognition using Random Ferns", IEEE Transactions on Pattern Analysis and Machine Intelligence, vol. 32, Nr. 3, Mar. 2010, pp. 448-461.

(Continued)

*Primary Examiner* — Sean Motsinger
(74) *Attorney, Agent, or Firm* — Hogan Lovells US LLP

(57) ABSTRACT

The subject technology provides embodiments for performing fast corner detection in a given image for augmented reality applications. Embodiments disclose a high-speed test that examines intensities of pairs of pixels around a candidate center pixel. In one example, the examined pairs are comprised of pixels that are diametrically opposite ends of a circle formed with the candidate center pixel. Further, a pyramid of images including four rings of surrounding pixels is generated. An orientation of the pixels from the four rings are determined and a vector of discrete values of the pixels are provided. Next, a forest of trees are generated for the vector of discrete values corresponding to a descriptor for a first image. For a second image including a set of descriptors, approximate nearest neighbors are determined from the forest of tree representing closest matching descriptors from the first image.

20 Claims, 12 Drawing Sheets

(56) References Cited

U.S. PATENT DOCUMENTS

| | | | | |
|---|---|---|---|---|
| 2014/0348431 | A1* | 11/2014 | Brick | G06K 9/00986 382/195 |
| 2015/0279048 | A1* | 10/2015 | Kim | G06K 9/469 382/199 |
| 2015/0294152 | A1* | 10/2015 | Florentz | G06K 9/00624 382/103 |

OTHER PUBLICATIONS

Mustafa Ozuysal et al., "Fast Keypoint Recognition in Ten Lines of Code", Conference on Computer Vision and Pattern Recognition, Minneapolis, MI, Jun. 2007.

Vincent Lepetit et al., "Keypoint Recognition using Randomized Trees", Transactions on Pattern Analysis and Machine Intelligence, vol. 28, Nr. 9, 2006, pp. 1465-1479.

Liu Yang et al., "Unifying Discriminative Visual Codebook Generation with Classifier Training for Object Category Recognition", Conference on Computer Vision and Pattern Recognition, 2008.

Frank Moosmann et al., "Fast Discriminative Visual Codebooks using Randomized Clustering Forests", NIPS, 2006.

Edward Rosten et al., "Faster and better: A machine learning approach to corner detection", IEEE Trans. Pattern Analysis and Machine Intelligence, 2010.

Alexandre Alahi et al., "FREAK: Fast Retina Keypoint", Conference on Computer Vision and Pattern Recognition, 2012.

Michael Calonder et al., "BRIEF: Binary Robust Independent Elementary Features", Computer Vision, ECCV, 2010.

Ethan Rublee et al., "ORB: an efficient alternative to SIFT or SURF", ICCV, 2011.

\* cited by examiner

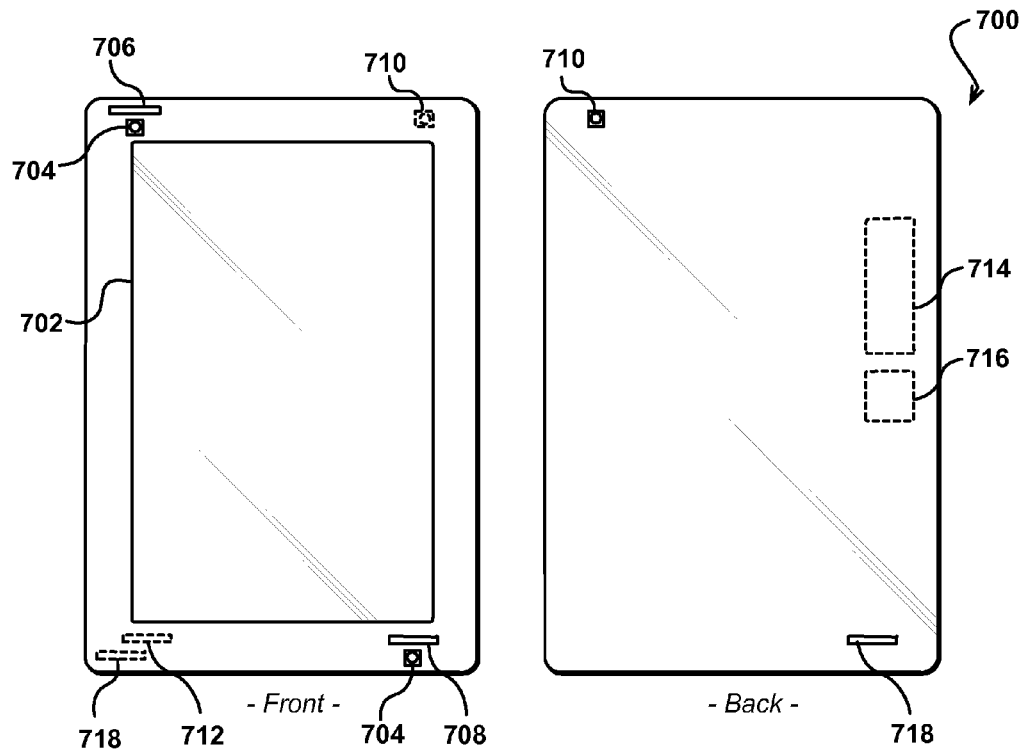
*FIG. 7A*  *FIG. 7B*
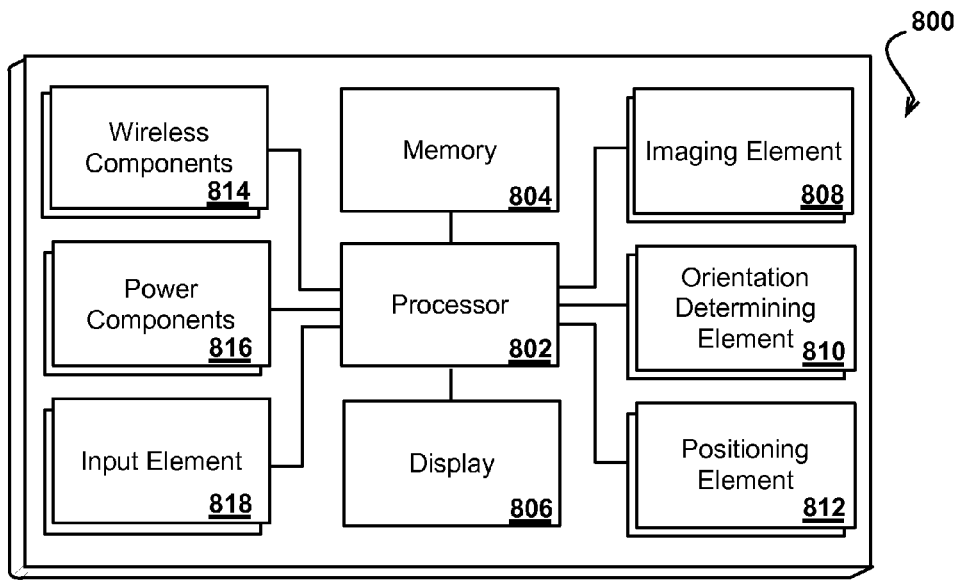
*FIG. 8*

FAST INTEREST POINT EXTRACTION FOR AUGMENTED REALITY

BACKGROUND

Users are increasingly utilizing electronic devices to obtain various types of information. For example, a user wanting to obtain information about an object of interest can capture an image of the object and cause that image to be analyzed to determine a matching object in another image.

BRIEF DESCRIPTION OF THE DRAWINGS

The embodiments of the present technology will hereinafter be described in conjunction with the appended drawings, provided to illustrate and not to limit the technology, wherein like designations denote like elements, and in which:

FIGS. 7A and 7B illustrate front and back views, respectively, of an example electronic computing device that can be used in accordance with various embodiments;

FIG. 8 illustrates a set of basic components of an electronic computing device such as the device described with respect to FIGS. 7A and 7B.

DETAILED DESCRIPTION

Various embodiments of the subject technology relate to methods, systems and computer program products for different applications in improving implementation(s) of augmented reality in a mobile computing environment. Augmented reality (AR) may refer to a type of virtual reality that aims to duplicate the world's environment in a computing device. In an example, an AR system generates a composite view that is a combination of a real scene viewed by a user and a virtual scene generated by the computing device that augments the scene with additional information (e.g., virtual objects, text information, graphical information, etc.). The virtual scene generated by the computing device may be designed to enhance the user's sensory perception of the virtual world that the user may be seeing or interacting with.

In a traditional AR processing pipeline, there are 3 main steps that are simultaneously performed:
1) tracking the camera spatial environment, to know where the mobile device is with respect to the scene;
2) mapping the spatial environment, construct an 3D estimation and spatial understanding of the scene; and
3) rendering the virtual content.

AR was recently brought to a broad audience via mobile computing devices. However, mobile computing devices typically have a much more limited processing power and memory than less portable computers or desktop machines. The subject technology provides embodiments for fast and memory efficient techniques for implementing an AR experience that is suitable for the limitations of mobile computing devices. More specifically, the subject technology provides implementations for efficiently tracking the camera spatial environment, as mentioned above, in order to know where the mobile device is with respect to the scene.

In at least one embodiment, a processing pipeline for tracking the camera spatial environment may include (one or more of) the following processing steps: 1) image capture; 2) feature point detection; 3) feature point description; 4) matching with approximate nearest neighbor (ANN); 5) refinement with random sample consensus (RANSAC); and 6) homography (e.g., transformation from a first image to a second image).

Feature Point Detection

Figure 1:
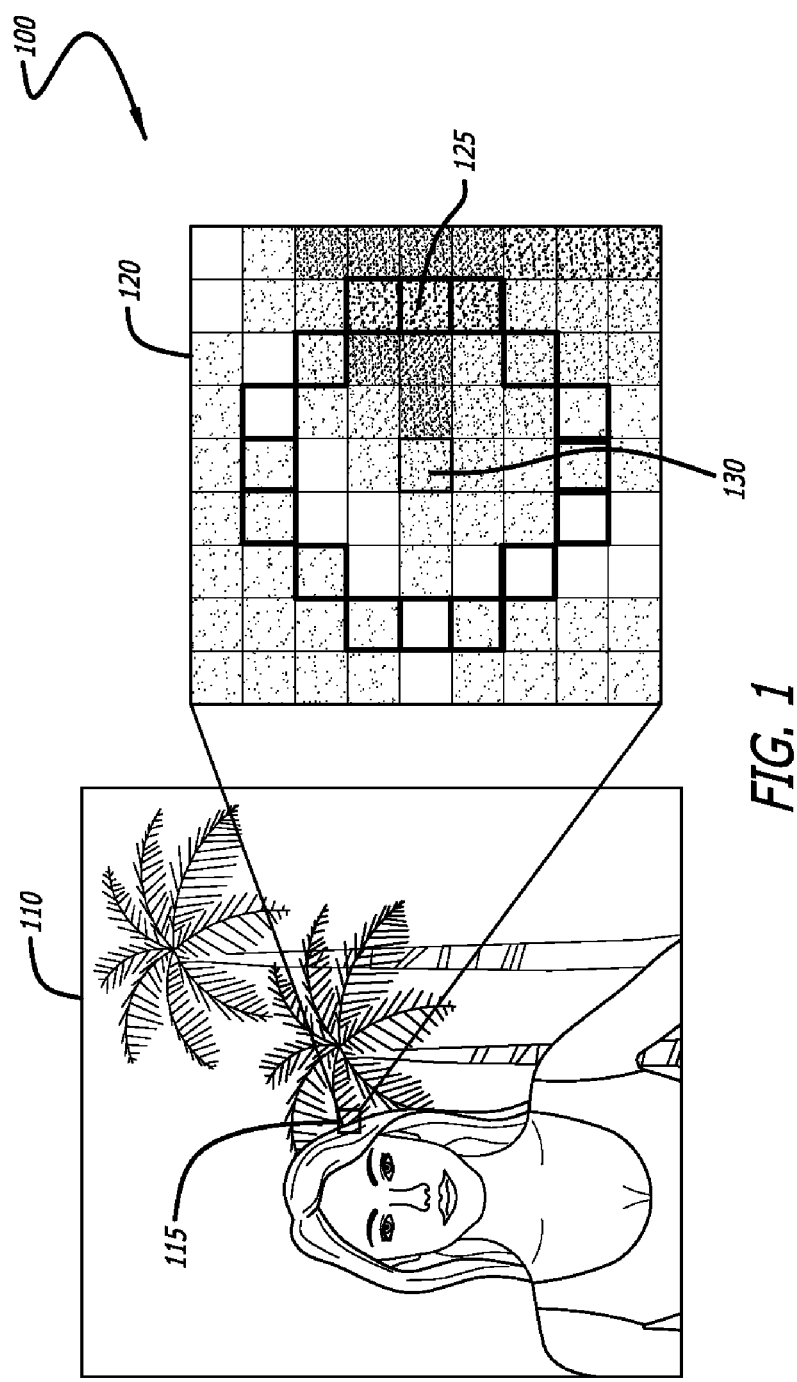
FIG. 1 is a conceptual diagram of a non-limiting example of extracting a corner feature or feature of interest in an image.

FIG. 1 is a conceptual diagram of a non-limiting example 100 of extracting a corner feature or feature of interest (e.g., feature point) in an image. As used herein, a feature may be understood as an "interesting" portion of an image, and the feature(s) that are detected in the image are used as a starting point for one or more computer vision algorithms. Moreover, features are often used as the main inputs for subsequent algorithms, the overall quality of the encompassing computer vision algorithm may often be dependent on the implementation of the feature detector.

In the context of augmented reality, an image of an object (or person, etc.) can be captured in a substantially real-time manner using a camera of a mobile computing device. Using an appropriate application executing on a computing device, a user is able to obtain an image of the object by positioning the mobile computing device such that the object is within a field of view of at least one camera of the mobile computing device. Although a mobile computing device (e.g., an electronic book reader, smart phone, or tablet computer) is discussed herein, it should be understood that any electronic device capable of receiving, determining, and/or processing input can be used in accordance with various embodiments discussed herein, where the devices can include, for example without limitation, head-mounted displays and other wearable computing devices (e.g., glasses, visors, watches, wristbands, etc.), desktop computers, notebook computers, personal data assistants, video gaming consoles, television set top boxes, and portable media players, among other such devices.

In this example, a camera on the mobile computing device captures an image 110 (e.g., still image or video) including an object of interest such as a person (or portion thereof). In some embodiments, one or more image analysis algorithms can attempt to locate one or more objects in an image to be analyzed. More specifically, the example of FIG. 1 conceptually shows the result of a feature point extractor that uses a technique for corner detection based at least on an improvement of "Features from Accelerated Segment Test" (FAST). In at least one embodiment, FAST is a technique for corner detection, which may be used to extract feature points and later used to track and map objects in one or more computer vision tasks. An advantage of FAST corner detector is computational efficiency (e.g., faster than many other feature extraction methods, such as difference of Gaussians (DoG) in an example). FAST corner detector therefore is suitable for real-time video processing application, including augmented reality application(s), because of its performance characteristics.

A corner feature 115 from a portion of the image 110 is detected in the image 110 shown in FIG. 1. Further, a set of pixels 120 from the detected corner feature 115 is shown in FIG. 1. There are sixteen pixels (each pixel indicated in black that form a ring-type shape comprising a neighborhood of pixels around the pixel 130) that surround a center pixel 130 that is centered in the set of pixels 120. The goal is to compare the center pixel 130 to each of the sixteen pixels surrounding the center pixel 130. In particular, a segment test criterion operates by considering the circle of sixteen (16) pixels around a corner candidate pixel p, such as center pixel 130 in this example, with a pixel intensity $I_p$. A corner may be detected when a certain amount of darker pixels (e.g., lower intensity) surround the center pixel 130 and a certain amount of brighter pixels (e.g., higher intensity) surround the center pixel 130. An existing implementation of a feature detector based on FAST may classify p as a corner if there exists a set of twelve (12) contiguous pixels in the circle which are all brighter than the intensity of the candidate pixel $I_p$ plus a threshold t (t is user specified in at least one example), or all darker than $I_p$–t (e.g., the difference between the intensity of the candidate pixel $I_p$ minus the threshold t). In this example, a pixel 125 represents pixel number zero (e.g., $p_0$) for the set of sixteen pixels surrounding the center pixel 130, and each of the subsequent pixels starting from the pixel 125 in a counter-clockwise direction may be incrementally labeled in a respective manner (e.g., $p_1, p_2, p_3, p_4 \ldots p_{15}$). In at least one embodiment, using a higher value for the threshold makes the corner detection more selective for a given candidate center pixel. Further, in at least one embodiment, an intensity value may be an 8-bit value with a range of 0 to 255. It is appreciated that an intensity value fall within have other ranges of values and still be within the scope of the subject technology.

To improve the computational efficiency of the aforementioned existing implementation, the subject technology optimizes the account of calculations that are required to be further which is further described below in connection with FIG. 2.

Figure 2:
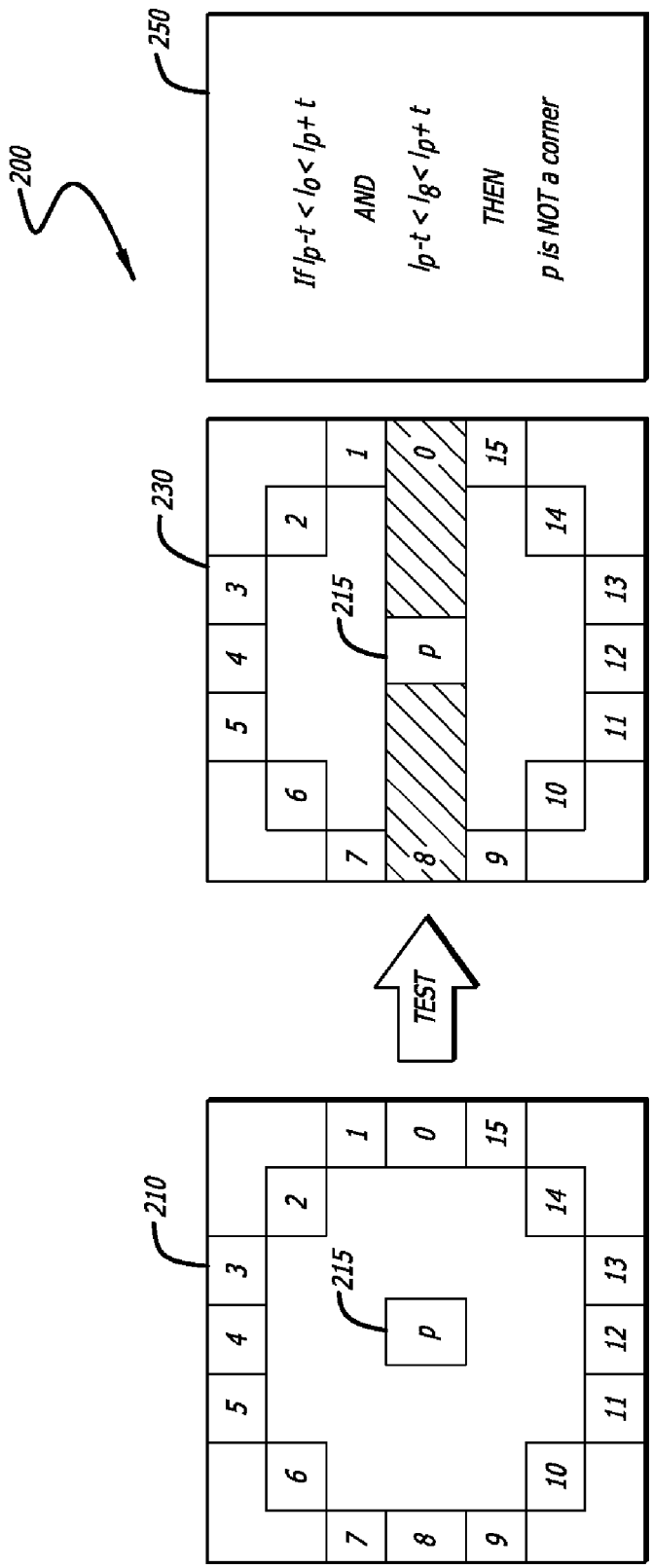
FIG. 2 is a conceptual diagram of a non-limiting example of detecting a corner feature based on pixels of a given image.

FIG. 2 is a conceptual diagram of a non-limiting example 200 of detecting a corner feature based on pixels of a given image. As shown in FIG. 2, a set of pixels 210 may represent a subset of the set of pixels 120 surrounding the center pixel 130 (e.g., the corner candidate pixel) shown in FIG. 1. The following discussion describes a technique for improving a FAST technique for corner detection.

In this example, a center pixel 215 may correspond to the center pixel 130 as shown in FIG. 1. A set of pixels 230 (e.g., 7×7 pixels) may correspond to an area of inspection of an image, which includes the center pixel 215 and a ring of sixteen (16) pixels that are to be examined. The high-speed test examines pixels 0 and 8 in an initial calculation to determine the respective intensities of pixels 0 and 8. If the intensities of both pixels 0 and 8 are within plus or minus a threshold value to the intensity of the center pixel 215 (e.g., denoted as $I_p$–t, $I_p$+t), then pixel p corresponding to the center pixel 215 cannot be a corner. An example mathematical notation 250 is shown to illustrate the test that is performed for different pairs of pixels that surround the center pixel 215. Alternatively, if pixel p can still be a corner, subsequent pairs of pixels are examined until determining that center pixel p is a corner (e.g., when all pixels are examined and the center pixel p does not meet the relationship shown in mathematical notation 250) or determining that center pixel p is not a corner (e.g., when one of the pairs of examined pixels meets the relationship shown in mathematical notation 250). In at least one embodiment, the examined pairs are pixel pairs (0, 8), (4, 12), (2, 10), (6, 14). Further, pixel pairs (5, 13), (3, 11), (1, 9) and (7, 15) may also be examined in a similar manner. Therefore, the examined pairs are comprised of pixels that are diametrically opposite ends of the circle formed with the center pixel 215 corresponding to p. It is appreciated that the aforementioned examination of the pairs of pixels may occur in any suitable order (e.g., ascending, descending, etc.).

As a final step, the improved FAST technique performs one last test for different pairs of pixels to determine that certain pixels pairs are different. For instance, a test is performed for pixels 0 and 8 to determine that if pixel 8 is dark then pixel 0 is brighter, or if pixel 0 is dark then pixel 8 is brighter, etc. This last test may be denoted as the following mathematical notations:

TEST(0)≠TEST(8) AND TEST(2)≠TEST(10) AND
TEST(4)≠TEST(12) AND TEST(6)≠TEST(14)
where TEST(i)=1 if $I_p$–t<$I_i$<$I_p$+t,0 otherwise.

Performing this last test is faster than a typical FAST implementation and provides more repeatable interest points. Once a corner is detected, the remaining pixel values 1, 3, 5, 7, 9, 11, 13, 15 may be extracted or determined for corner description use.

Feature Point Description

Figure 3:
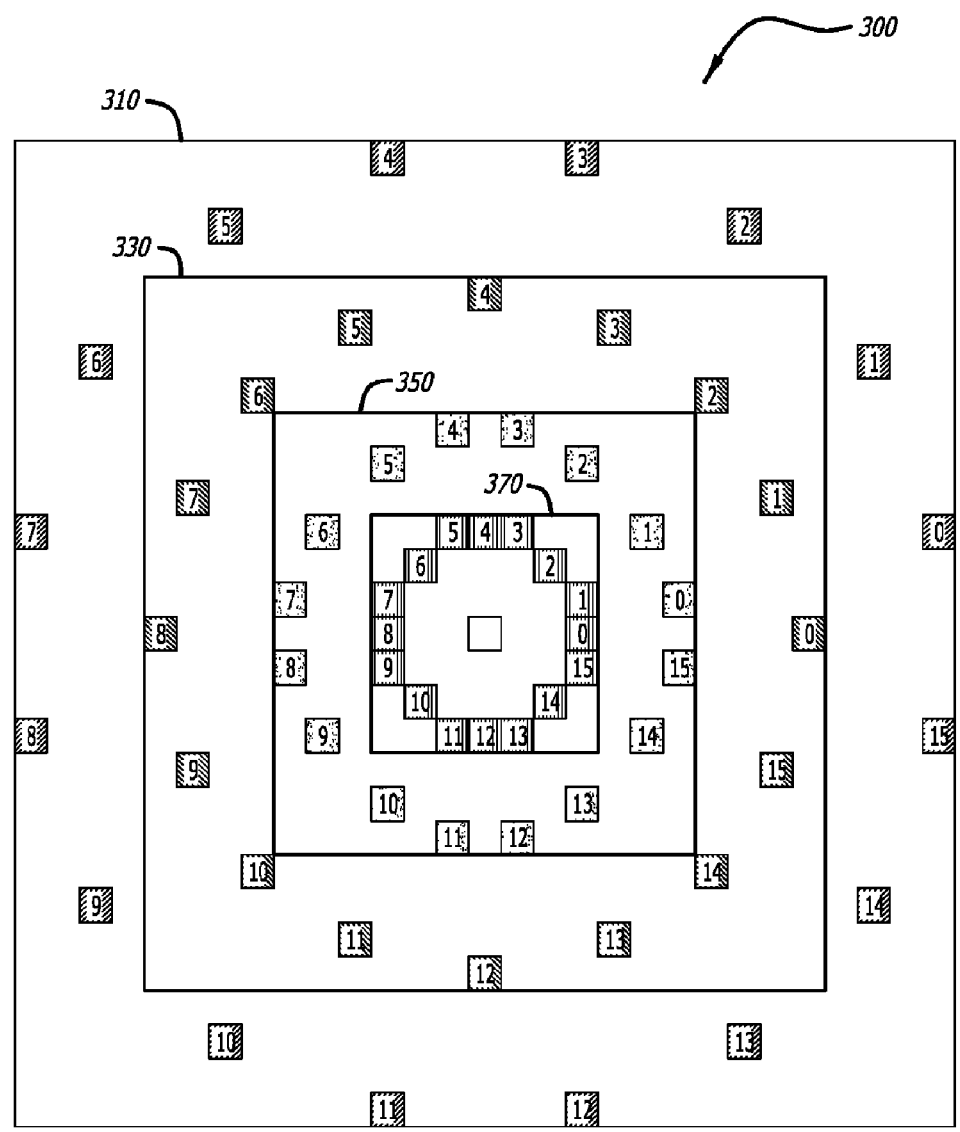
FIGS. 3 and 4 conceptually illustrate examples of different rings of pixels used by a feature descriptor with a vector of 64 discrete values in accordance to some embodiments of the subject technology.
Figure 4:
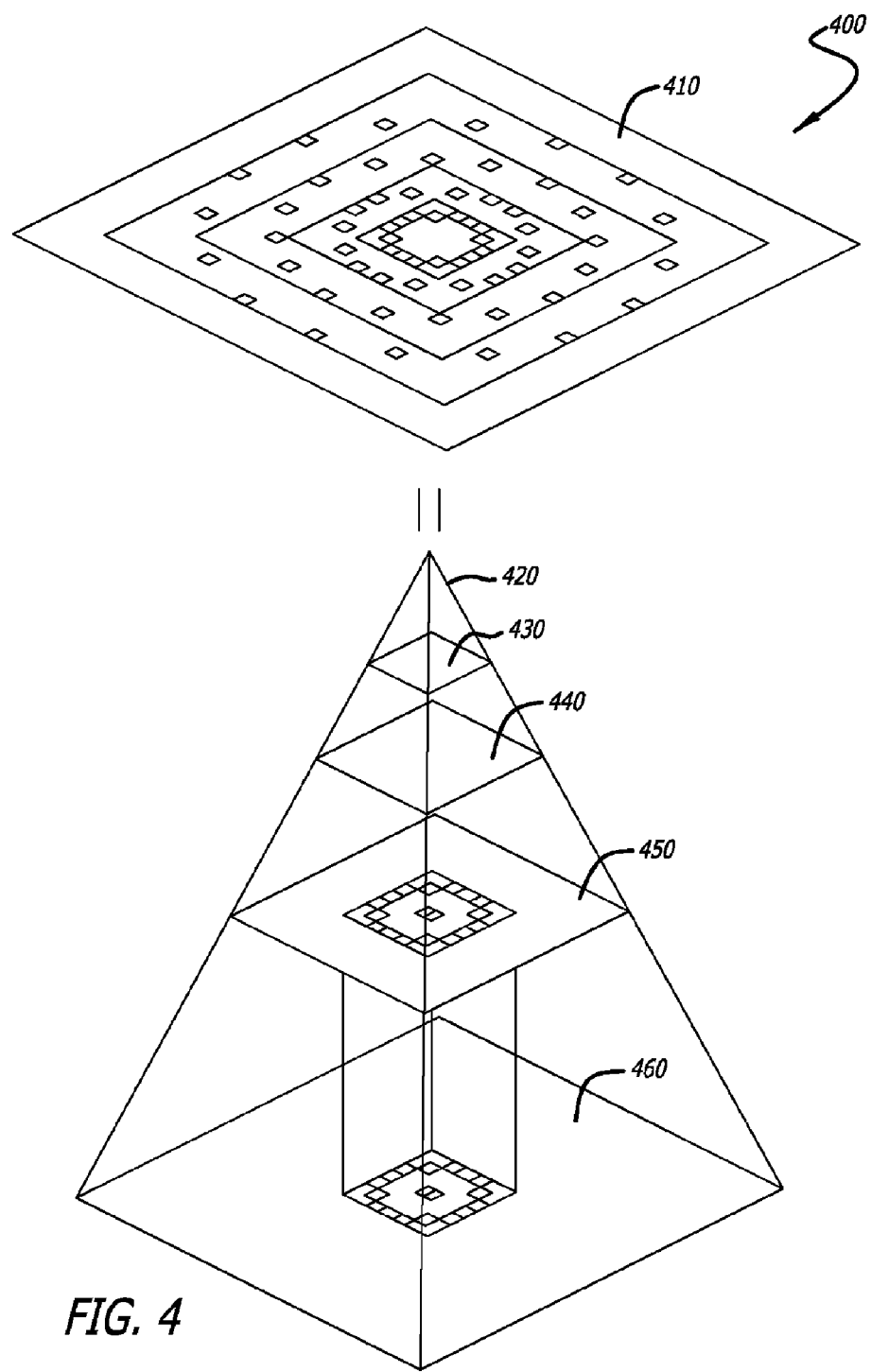

FIGS. 3 and 4 conceptually illustrate examples 300 and 400 of different rings of pixels used by a feature descriptor with a vector of 64 discrete values in accordance to some embodiments of the subject technology. In these examples, the feature descriptor provided by at least one embodiment may use additional rings of pixels having different radii for performing feature description. Thus, each ring of pixels serves as values for the descriptor in at least one embodiment of the subject technology.

In some embodiments, the descriptor implementation disclosed herein is similar to existing DAISY, BRISK, BRIEF and FREAK descriptors. For instance, average intensity values surrounding the detected corner are computed. To improve upon the aforementioned existing descriptors, four rings of surrounding pixels are then considered that form different levels of a pyramid including multiple images. As shown in FIG. 3, a ring of pixels 370, a ring of pixels 350, a ring of pixels 330 and a ring of pixels 310 represent different surrounding pixels for a candidate corner pixel (e.g., shown in the center of the ring of pixels 370) in which an orientation estimation may be performed upon. The ring of pixels 370 represent intensity values of pixels for a bottom level (layer 0) of the pyramid, the ring of pixels 350 represent intensity values of pixels for a second level (layer 1) subsequent to the bottom level, the ring of pixels 330 represent intensity values of pixels for a third level (layer 2) subsequent to the second level, and the ring of pixels 310 represent intensity values of pixels for top level (layer 3) of the pyramid subsequent to the third level. Each subsequent level of the pyramid may be a downscaled version of the previous level. In the example of FIG. 3, a subsequent level of the pyramid (that represents a downscaled version of a prior level) is depicted as having a greater radius than the previous level because, even though a relative area of inspection in the image may remain constant for each level, the downscaled subsequent level is visually represented as being a more "zoomed-in" version of the previous level and shown as having a greater radius in the representation of FIG. 3. Thus, in at least one embodiment, the bigger the ring of pixels, the more averaged the pixel intensity. The different ring of pixels shown in FIG. 3 correspond, by reference to FIG. 4, to rings of pixels 410 as illustrated in FIG. 4.

For efficiency, a pyramid of images is computed, and each image in the pyramid being a down-sampled version of the previous one. As discussed before, each layer of the pyramid that is higher than the bottom layer (e.g., layer 0) represents a downscaled image of the previous layer and has a radius that is greater than the previous level, which can be seen in an example ring of pixels 410. Each ring is computed the same way by using the same pattern of 16 pixels as the one used for corner detection discussed before (e.g., including 16 values), but at different levels of the pyramid in which each successive level of the pyramid has a greater radius than the previous level (e.g., a downscaled image) in the ring of pixels 410. A pyramid 420 in FIG. 4 includes different levels 460, 450, 440 and 430, which may be analyzed starting from the bottom level and continuing up to the top level of the pyramid. In this example, a first ring representing the bottom level of the pyramid does not need to be computed since this ring of pixels was already extracted during the corner detection phase discussed above in connection with FIGS. 1 and 2. As illustrated in FIG. 4, a bottom level 460 of a pyramid 420 corresponds, by reference to FIG. 3, to the ring of pixels 370; a first level 450 of the pyramid 420 corresponds to the ring of pixels 350; a second level 440 of the pyramid 420 corresponds to the ring of pixels 330; and a third level 430 of the pyramid 420 corresponds to the ring of pixels 310. Thus, since there are 4 levels in the pyramid 420 and each level having 16 pixels, the descriptor according to at least one embodiment will provide a vector of 64 discrete values (e.g., 4×16=64).

In some programming languages such as C or C++, the largest number type (e.g., DOUBLE value) is a 64 bit value which means that the aforementioned vector of 64 discrete values can be represented in a single 64 bit value for that programming language. A common word size for a given computing device is 64 bits, and instructions in the instruction set of a processor may be 64 bits. Therefore, it is advantageous to have a 64 bit descriptor and it may be processed in a single instruction cycle (e.g., instead of 64 instructions cycles) and efficiency and speed is improved.

In one example, each of the 64 values may be placed into a matrix with 4 rows and 16 columns, with each row of the matrix corresponding to a respective layer or level in the pyramid 420 as described before. If each value in the matrix is shifted by a certain number of positions in the matrix (e.g., 2 positions to the right, or 3 positions to the left, etc.), this operation(s) is equivalent to rotating the image by a certain amount. This results in normalizing the descriptor so that matching between two images can occur within the same axis of orientation when the image is rotated.

In an example where an image is rotated, an extracted feature may also be rotated as well. Thus, when performing matching between two respective images, the matching should be invariant to an image transformation(s) (e.g., orientation and/or scale). One way to determine orientation is through using a ring of sixteen (16) pixels and the values associated with the pixels therein.

For this orientation determination, a derivative of a respective ring of pixels is determined in accordance with the following description and example mathematical notations.

Orientation estimation θ:

A gradient (Dx, Dy) around the corner p is first estimated as follows:

$$Dx = 3*(I_0+I_1+I_{15})+2*(I_2+I_{14})+I_3+I_{13}-3*(I_7+I_8+I_9)-2*(I_6+I_{10})-I_5-I_{11}$$

$$Dy = 3*(I_3+I_4+I_5)+2*(I_2+I_6)+I_1+I_7-3*(I_{11}+I_{12}+I_{13})-2*(I_{10}+I_{14})-I_9-I_{15}$$

Dx includes weighted sums of intensities of respective pixels on the right side of a ring of pixels and from the left side of the ring of pixels. The difference between the weighted sums of the right side pixels and the left side pixels is then taken. Pixels that are closer in proximity to the candidate corner pixel p (e.g., the center pixel p) will be weighted more heavily than pixels that are further away. The motivation for weighting pixels that are further away from candidate corner pixel p is that pixels that are further away are less likely to reflect the property around the candidate corner pixel p. Similarly, Dy includes weighted sums of intensities of respective pixels on the upper side of the ring of pixels and from the bottom side of the ring of pixels. The difference between the weighted sums of the upper side pixels and the bottoms side pixels is then taken.

The orientation θ, where θ represents an angle, may be determined by the following arctangent function:

$$\theta = \arctan(Dy/Dx).$$

For the above function, Dy/Dx represents a vector and taking the arctangent of the vector will determine an angle corresponding to the orientation θ.

The orientation θ is then discretized into 16 values by the following calculation:

$$\theta_{discrete} = \theta * 16/360.$$

In order to make the descriptor rotation invariant, each value in each ring is shifted by $\theta_{discrete}$. It is appreciated that shifting each value in the ring is equivalent to rotating the ring but is a more efficient manner to make the descriptor rotation invariant. In at least one embodiment, scale invariance is achieved by performing corner detection and description on a pyramid of images, similar to a scale-invariant feature transform (SIFT) algorithm.

In an example where the orientation θ is 45 degrees and given that there 16 values per ring of pixels, there is a difference 22.5 degrees between each value in the ring of pixels and $\theta_{discrete} = 45*16/360 = 2$. In the aforementioned example of using a matrix which includes the 16 values per ring of pixels (e.g., in a respective row of the matrix), each value in the row of the matrix would be shifted by 2 positions (e.g., 2 positions to the left). Thus, in a typical approach where the image is immediately rotated to account for image rotation (which can be a computationally expensive operation), this approach allows for quickly computing the values of the ring of pixels and then shifting the values to account for image rotation (which is less computationally expensive).

Matching with Approximate Nearest Neighbor

Once the corner(s) is detected and descriptor values for the corner are generated as discussed above, the following phase includes matching between features in at least two respective images. Nearest neighbor search (NNS), also referred to as proximity search, similarity search or closest point search, is an optimization problem for finding closest (or most similar) points. Closeness, in one example, is typically expressed in terms of a dissimilarity function, e.g., the less similar are the objects, the larger are the function values.

The subject technology provides embodiments for implementing fast approximate nearest neighbor searches in high dimensional spaces (e.g., FLANN). In an example, a forest of trees are computed that will serve as nearest neighbor predictors. In particular, the vector of discrete values from the descriptor phase described above are placed into a data structure that includes a forest of trees. The forest of trees is used to perform computationally efficient matching. The descriptors of a first image are organized in a forest of trees in the following manner in at least one embodiment.

How to Build Each Tree:
Trees are recursively built as follow:
Given a set of descriptor $\{d_n\}$ (e.g., from a first image)
1. Binarize each descriptor $d_n$
2. Pick randomly K descriptors $\{\{\widetilde{d_k}\}\}$ as cluster centers (e.g., random selection may not choose the optimal descriptor(s))
3. Divide set $\{d_n\}$ into K subset $\{d_n\}_k$ such that the Hamming distance between each element in the subset $\{d_n\}_k$ and its cluster center $\{\widetilde{d_k}\}$ is the minimum one
4. For each subset $\{d_n\}_k$ repeat steps 1, 2 and 3 if the size $|\{d_n\}_k|$ of the subset $\{d_n\}_k$ is greater than a threshold (e.g., a certain amount of elements included)

Figure 5A:
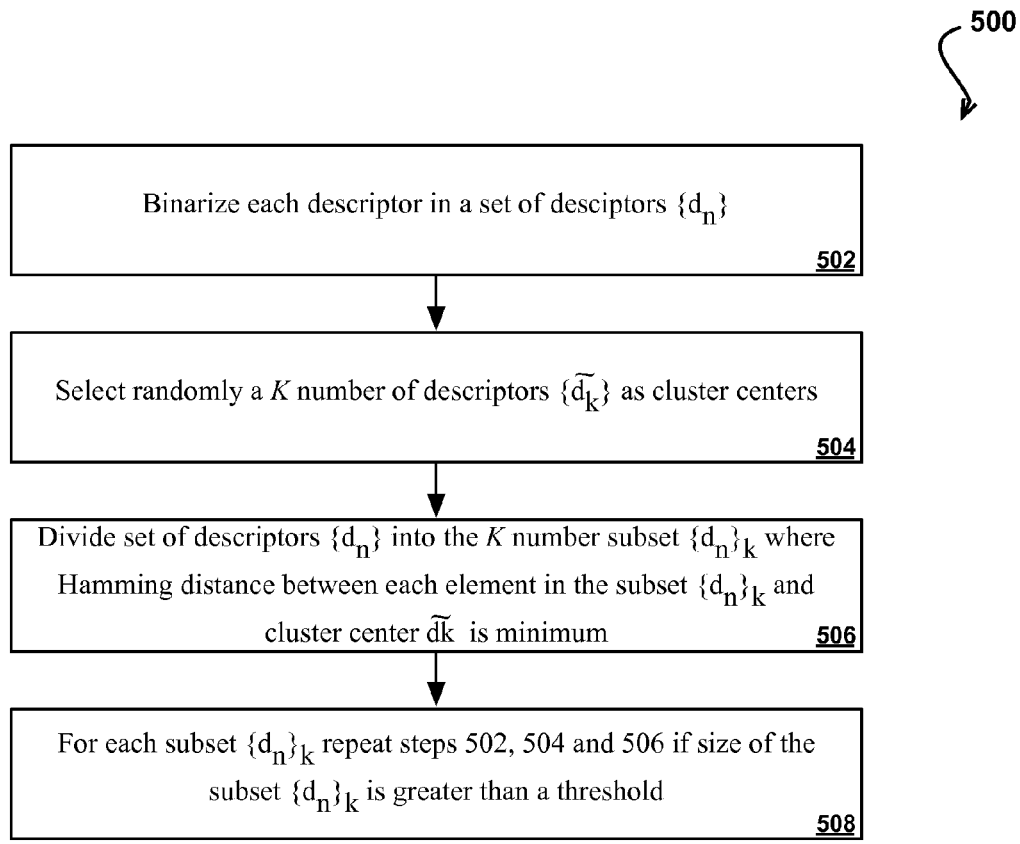
FIG. 5A illustrates steps of an example process for building each tree of a forest of trees for matching using approximate nearest neighbor that can be used in accordance with some embodiments of the subject technology.

FIG. 5A illustrates steps of an example process 500 for building each tree of a forest of trees for matching using approximate nearest neighbor that can be used in accordance with some embodiments of the subject technology. While the example process 500 are illustrated with a particular order of steps, those of ordinary skill in the art will appreciate that FIG. 5A and the steps illustrated therein can be executed in parallel (e.g., at the same time) or in any order that accomplishes the technical advantages of the present disclosure and can include fewer or more steps than illustrated. FIG. 5A corresponds to the aforementioned steps for building each tree as disclosed above.

At step 502, each descriptor in a set of descriptors $\{d_n\}$ are binarized. At step 504, K descriptors $\{\{\widetilde{d_k}\}\}$ are randomly select as cluster centers. At step 506, the set $\{d_n\}$ is divided into K subset $\{d_n\}_k$ so that the Hamming distance between each element in the subset $\{d_n\}_k$ and its cluster center $\widetilde{d_k}$ is the minimum one. As used herein, the Hamming distance between two strings (or other objects with iterable values) of equal length is the number of positions at which the corresponding symbols are different. At step 508, for each subset $\{d_n\}_k$ steps 502, 504 and 506 are repeated if the size $|\{d_n\}_k|$ of the subset $\{d_n\}_k$ is greater than a threshold.

The following disclosure describes an example for binarizing descriptors in example mathematical notation which may be used by at least one embodiment of the subject technology.

Binarizing Descriptors:
A descriptor d is binarized as follows:
For each value d(i) in d, output a 0 if $d(i) < I_p$, 1 if $d(i) >= I_p$ where $I_p$ is the intensity at the detected corner p. For example if $I_p=127$ and d=(12, 42, 159, 135, 1, 124, . . . , 210, 85) then the binary version will be (0, 0, 1, 1, 0, 0, . . . , 1, 0).

By using the forest of trees, the descriptors of the first image may be searched in logarithmic time complexity (e.g., a logarithmic time algorithm) instead of linear time complexity (e.g., linear time algorithm) and, thus, may be more efficient. After the descriptors from the first image are placed into the multiple tree data structure as described above, an descriptor from a second image may be used to find the approximate nearest neighbor. The following disclosure describes an example for finding the approximate nearest neighbor using the trees of the first image.

The following discussion provides an example process for generating a tree in accordance with some embodiments.

An example training set of 5 samples are provided in which each sample is a 3D descriptor.
$s_1$ [1, 0, 5]
$s_2$ [0, 3, 9]
$s_3$ [4, 8, 7]
$s_4$ [9, 2, 3]
$s_5$ [0, 4, 8]

Next, each sample may be binarized (e.g., to provide a binarized descriptor) such that if a value is above a threshold t (e.g., t=10 in this example) then the value set to 1 else the value is set to 0 as shown by the following:
$s_1$ [1, 0, 5]→[0, 0, 0]
$s_2$ [0, 3, 9]→[0, 0, 1]
$s_3$ [4, 8, 7]→[0, 1, 1]
$s_4$ [9, 2, 3]→[1, 0, 0]
$s_5$ [0, 4, 8]→[0, 0, 1]

A k number of samples are then randomly selected as cluster centers. In this example, $S_4$ and $S_3$ may be selected as cluster centers.

As shown in the following table, for each sample (e.g., in the leftmost column), the Hamming distance between its binary descriptor and the binary descriptor of the cluster centers is determined (e.g., as shown in each row corresponding to the sample).

| | Hamming Distance | |
| --- | --- | --- |
| | 1 ($S_4$) | 2 ($S_3$) |
| $S_1$ | 1 | 2 |
| $S_2$ | 2 | 1 |
| $S_3$ | 3 | 0 |
| $S_4$ | 0 | 3 |
| $S_5$ | 2 | 1 |

For each remaining sample, the closest cluster (in term of Hamming distance) is determined (e.g., by selecting the smallest Hamming distance). In the above example, the closest cluster for sample $S_1$ would be cluster center $S_4$. The closest cluster for sample $S_2$ would be cluster center $S_3$. Further, the closest cluster for sample $S_3$ would be cluster center $S_3$. The closest cluster for sample $S_4$ would be cluster center $S_4$. Next, the closest cluster for sample $S_5$ would be cluster center $S_3$.

Figure 5B:
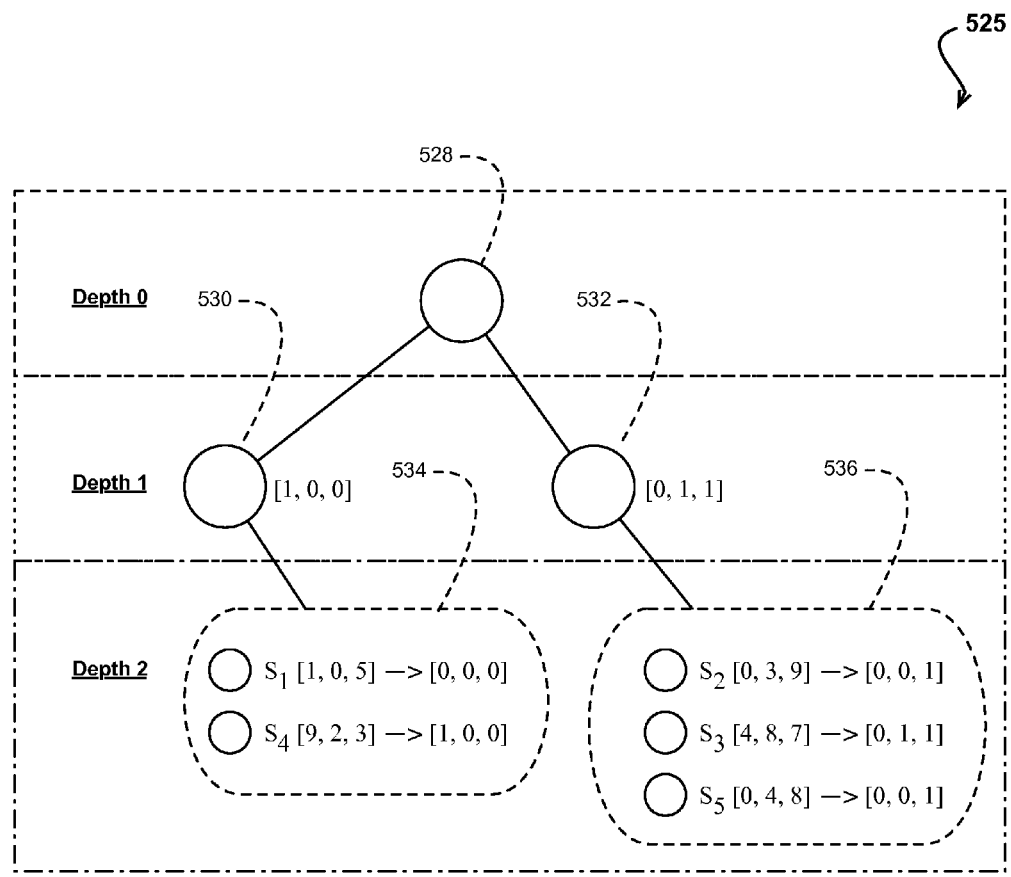
FIG. 5B illustrates an example of assigning samples to a closest center cluster in accordance with at least one embodiment of the subject technology.

Each sample is then assigned to its closest cluster center as shown in an example tree 525 of FIG. 5B. The example tree 525 includes a root node 528 and has 3 levels of depth (e.g., depth 0, depth 1 and depth 2). A node 530 represents a first cluster center with a binarized descriptor with values of [1, 0, 0] and a node 532 represent a second cluster center with a binarized descriptor with values of [0, 1, 1]. A leaf node 534 and a leaf node 536 are also included in the example tree 525. As shown, the leaf node 534 includes respective descriptors for samples $S_1$ and $S_4$. The leaf node 536 includes respective descriptors for samples $S_2$, $S_3$, and $S_5$.

Figure 5C:
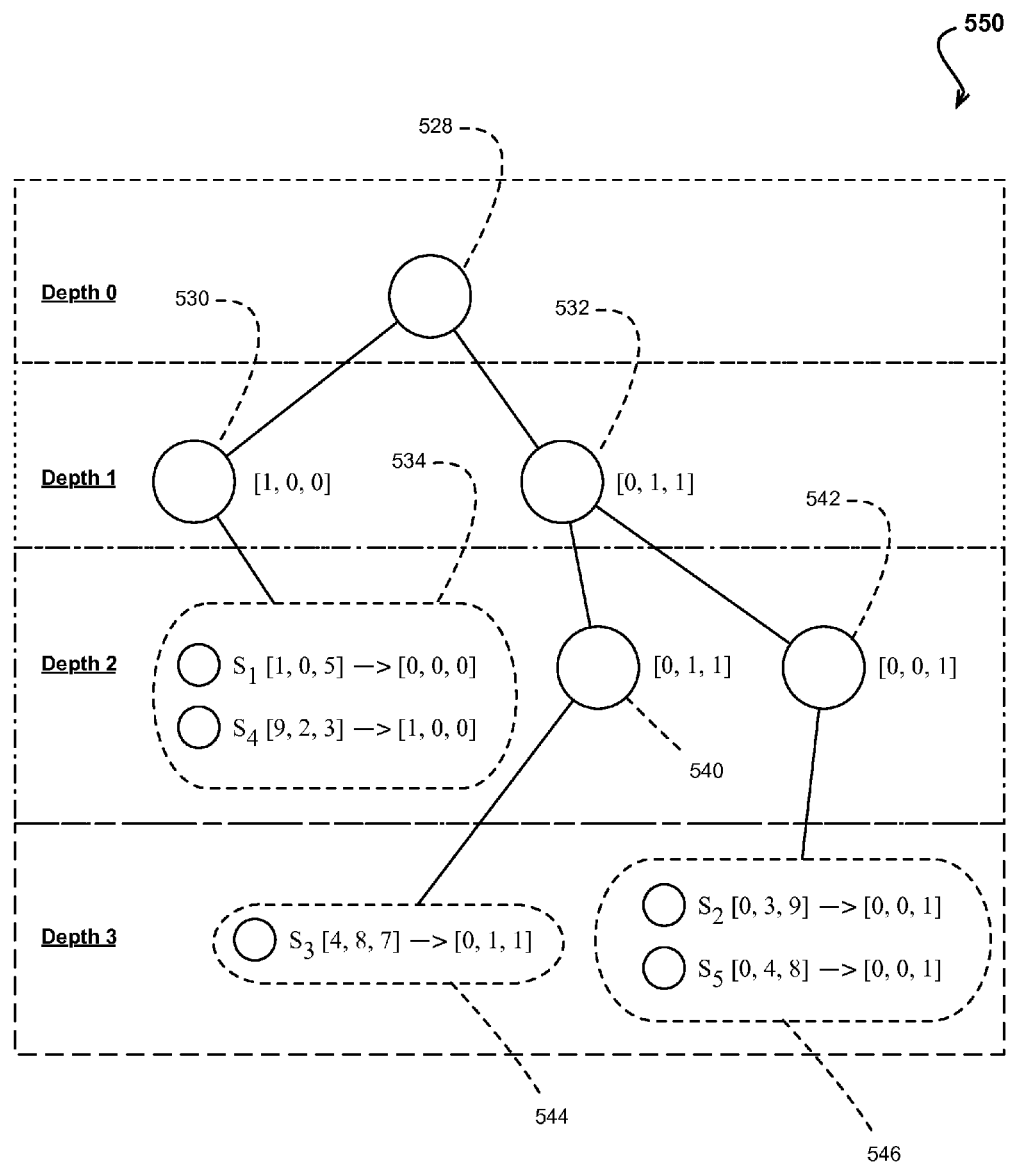
FIG. 5C illustrates an example of dividing elements in a given leaf node to meet a threshold requirement.

For each leaf node, the tree generation process is recursively iterated (e.g., step 4 described above that repeats steps 1-3) until the number of elements in the leaf nodes is less than a threshold number K. It is assumed that K has a value of 3 for an example tree 550 shown in FIG. 5C. FIG. 5C is similar to FIG. 5B (and includes some of the same reference numbers) and includes an example tree 550 with nodes 540, 542, and leaf nodes 544 and 546 at a new depth level 3. The leaf node 544 (at depth 3) includes the binarized descriptor of sample $S_3$. The leaf node 546 includes binarized descriptors of $S_2$ and $S_5$. As seen in the example tree 550, each of the leaf nodes 534, 544 and 546 have less than K (e.g., 3) number of elements or descriptors. The result of tree generation process produces the example tree 550 with 1) the node 540 corresponding to the binarized descriptor with values [0, 1, 1] connected to the leaf node 544 as a child node and 2) the node 542 corresponding to binarized descriptor with values [0, 0, 1] connected to the leaf node 546 as a child node. Thus, it can be seen that the leaf node 534 (with 2 descriptors), the left node 544 (with 1 descriptor) and the leaf node 546 (with 2 descriptors) each have less than K (e.g., 3) number of elements. The tree generation process at this point may end.

The following discussion relates to finding an approximate nearest neighbor using the forest of trees that may be generated in accordance with some embodiments.

Finding the Approximate Nearest Neighbor Using the Trees:
Given an input descriptor d (e.g., a descriptor from a second image)
1. Binarize d
2. For each tree (start at the root node of the tree and walk down the tree):
   a. Find the closest cluster center using Hamming distance
   b. Repeat step 2 for finding the closest cluster center until a leaf node is reach
   c. Once the leaf node is reached exhaustively find the closest descriptor using the full vector (not the binary version)
3. Find the closest descriptor among the trees.

Figure 6A:
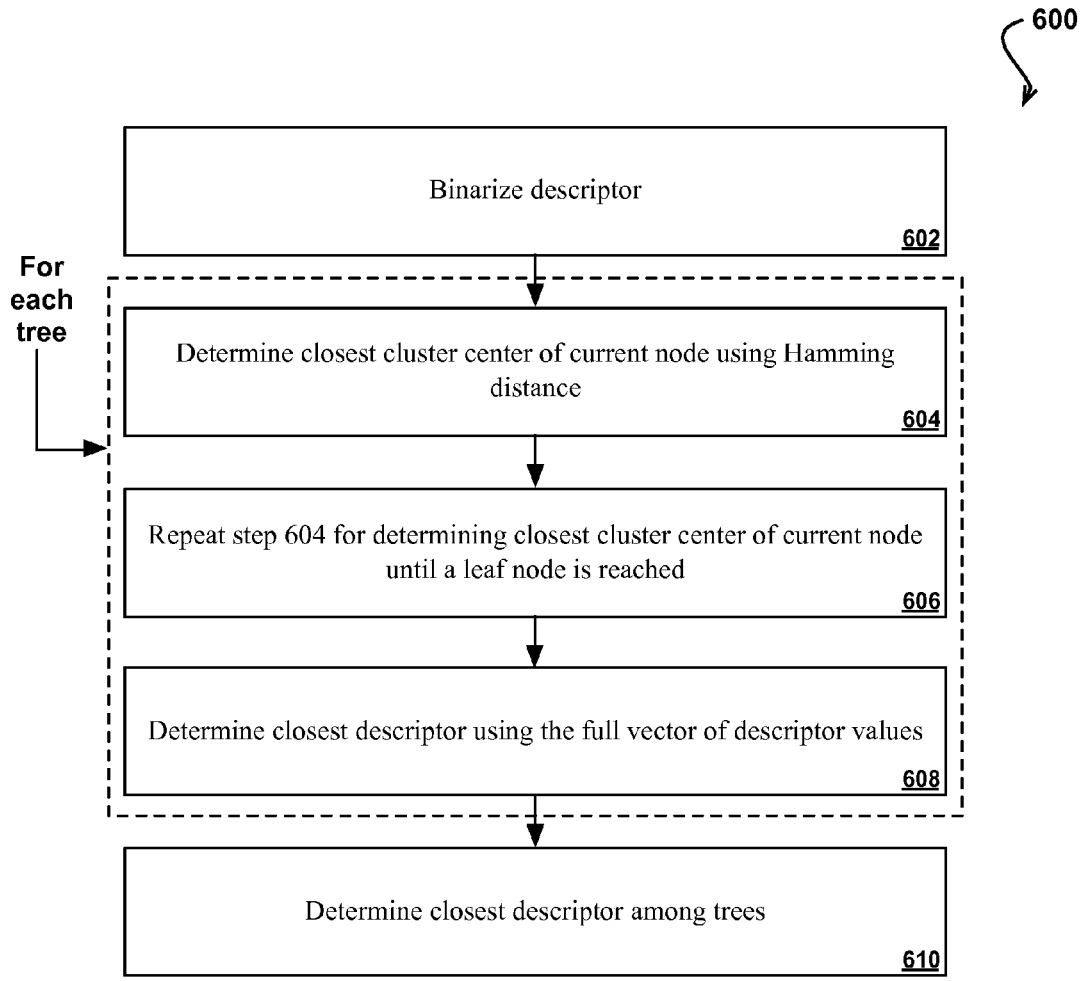
FIG. 6A illustrates steps of an example process for finding the approximate nearest neighbor using the trees that can be used in accordance with some embodiments of the subject technology.

FIG. 6A illustrates steps of an example process 600 for finding the approximate nearest neighbor using the trees that can be used in accordance with some embodiments of the subject technology.

At step 602, an input descriptor d is binarized (e.g., in accordance with the example binarization technique above). For each tree, the following steps in 604, 606 and 608 may be performed. At step 604, closest cluster center using Hamming distance is determined. At step 606, step 604 is repeated for determining the closest cluster center until a leaf node is reached. At step 608, once the leaf node is reached or found, the closest descriptor exhaustively searched for using the full vector of descriptor values (e.g., not the binary version). At step 610, a closest descriptor among the trees is determined.

Figure 6B:
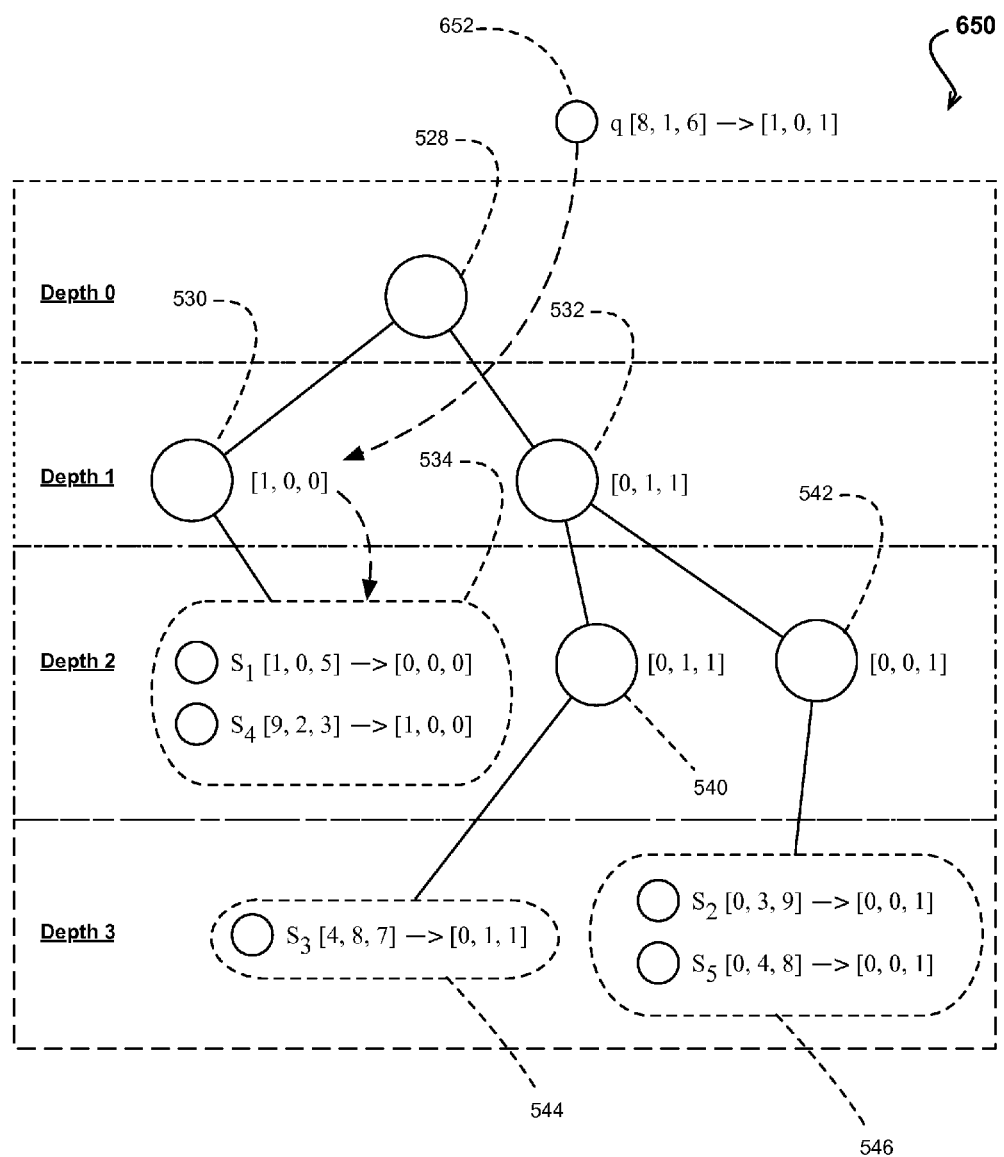
FIG. 6B describes an example for traversing an example tree in accordance with some embodiments of the subject technology.

FIG. 6B describes an example for traversing an example tree 650. The example tree 650 is similar to the example tree 550 in FIG. 5C and includes some of the same reference numbers. The example tree 650 includes a query descriptor 652 that will be used to traverse the example tree 650. As shown, the query descriptor 652 corresponds to a query descriptor q with values of [8, 1, 6]. After undergoing binarization, the query descriptor q corresponds to a binarized descriptor with values of [1, 0, 1]. The tree 650 may then traversed, in a recursive manner using the binarized descriptor of the query descriptor 652 and its Hamming distance to other binarized descriptors (and their values) at different depths of the tree 650.

Starting from the root node 528, respective Hamming distances are determined for the binarized descriptor of the query descriptor 652. The root node 528, in this example, is connected to multiple child nodes 530 and 532, and in order to determine which child node to traverse further down the tree 650 (e.g., to further depths), the Hamming distances may be computed. Specifically, the Hamming distance of the binarized descriptor corresponding to node 530, and the Hamming distance of the binarized descriptor corresponding to node 530 are determined based on the binarized descriptor of the query descriptor 652. In this example, the Hamming distance of the node 530 to the query descriptor 652 is a value of 1 by comparing, respectively, the binarized values of [1, 0, 0] to the binarized values of [1, 0, 1]. Also, the Hamming distances of the node 532 to the query descriptor 652 is a value of 2 by comparing, respectively, the binarized values of [0, 1, 1] to the binarized values of [1, 0, 1]. As discussed before, the Hamming distance may be determined by the number of positions at which the corresponding values are different.

Based on the lowest Hamming distance determined as discussed above, the tree 650 is traversed to the node 530 at depth 1. Next, it is determined whether the node 530 is connected to any child nodes, and based on this determination, the tree 650 is traversed to the child node 534 in the tree 650. Since there is only 1 child node that is connected to the node 530, the Hamming distances are not required to be determined between multiple child nodes (e.g., in order to determine which of the multiple child nodes to further traverse down the depth of the tree 650 as mentioned above). The tree 650 may be traversed in this manner until a left node is reached. As shown, the node 534 is a leaf node and traversal of the tree 650 may cease at this point.

Figure 6C:
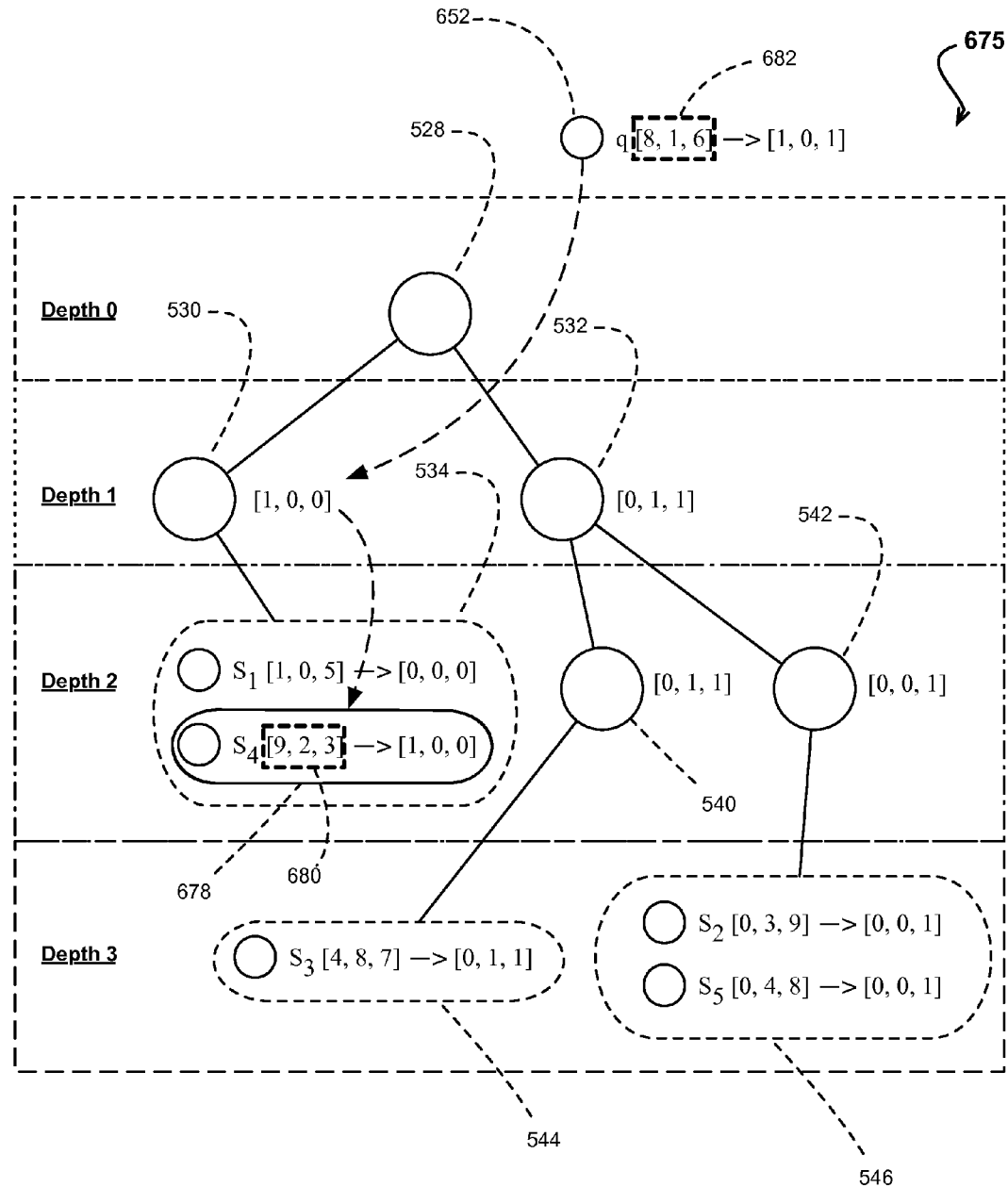
FIG. 6C describes an example for finding a closest element in a leaf node for an example tree in accordance with some embodiments of the subject technology.

FIG. 6C describes an example for finding a closest element in a leaf node for an example tree 675. The example tree 675 is similar to the example tree 550 in FIGS. 5C and 6B and includes some of the same reference numbers.

After reaching the leaf node 534 as described above, "a closest" descriptor to the query descriptor 652 is selected at the leaf node. As shown in this example, the leaf node 534 has multiple descriptors (and values associated therewith). In order to select the closest descriptor among multiple descriptors, in at least one embodiment, by using a full (e.g., non-binarized) descriptor among the multiple descriptors in the leaf node 534 and determining a Euclidian distance between a full, non-binarized descriptor 682 of the query descriptor 652. As shown, based on the Euclidian distance between a full descriptor 680 of a descriptor 678 in the leaf node 534 to the full, non-binarized descriptor 682 of the query descriptor 652, the descriptor 678 is determined to be the closest descriptor to the query descriptor 652. In a three-dimensional Euclidean space (e.g., for each of the 3D descriptors provided in this example), the distance may be determined using the following formula:

$$d(p,q) = \sqrt{(p_1-q_1)^2 + (p_2-q_2)^2 + (p_3-q_3)^2}.$$

Thus, using the above formula, the Euclidian distance between the values of the full descriptor 680 and the non-binarized descriptor 682 of the query descriptor 652 is approximately a value of 3.32. The Euclidian distance, again using the above formula, between the values (e.g., [1, 0, 5]) of the full descriptor of the other descriptor in the leaf node 534 and the non-binarized descriptor 682 of the query descriptor 652 is approximately a value of 7.14. Consequently, the descriptor 678 is selected as the closest descriptor (e.g., the approximate nearest neighbor) to the query descriptor 652 in the example of FIG. 6C.

After the approximate nearest neighbors from the first image are determined for each descriptor from the second image, as described above, a technique for matching refinement using "RANdom SAmple Consensus" may be performed.

Matching Refinement with RANSAC

As referred to herein, RANSAC is an abbreviation for "RANdom SAmple Consensus." In at least one example, RANSAC is an iterative method to estimate parameters of a mathematical model from a set of observed data which contains outliers.

A basic assumption with RANSAC is that the data consists of "inliers" (e.g., data whose distribution can be explained by some set of model parameters), though may be subject to noise, and "outliers" which are data that do not fit the model. The outliers can come, for example, from extreme values of the noise or from erroneous measurements or incorrect hypotheses about the interpretation of data. RANSAC also assumes that, given a (usually small) set of inliers, there exists a procedure which can estimate the parameters of a model that optimally explains or fits this data. In one example, an end result from RANSAC is a transform that "best" transforms points from the second image to the first image.

In at least one embodiment, RANSAC is used to further refine a set including the determined approximate nearest neighbors from the first image for each of the descriptors from the second image. A resulting subset of nearest neighbors from the first image may be provided as a more refined set of nearest neighbors from the first image for the second image.

The ANN algorithm in at least one embodiment allows to quickly establish correspondences between feature points of at least two images. Once an initial match is determined (e.g., a set of feature point pairs), the last step is to prune outlier correspondence pairs and estimate a geometric transform (e.g., the homography H as described herein) between images.

In one example, a RANSAC algorithm for homographies may involve the following steps:
1. Iterate until satisfied with model H:
   a. Pick 4 (non-collinear) random pairs
   b. Estimate a homography H from the 4 pairs
   c. Check how many pairs validate the estimated model H
   d. Keep H with the highest number of inlier pairs
2. Re-estimate H with all the inliers.

An improved RANSAC algorithm may involve a new way of estimating a homography H from the 4 pairs (e.g., in step 1b above) and re-estimating H with all the inliers (e.g., step 2 above), and a preprocess step to prune obvious outlier pairs.

Pruning Obvious Outliers:

A "rough" estimate of the rotation part of the homography based on the orientation difference between matching feature points may be determined. All pairs with a matching distance over a threshold may be discarded and pairs that produce an orientation difference that is too far from the orientation estimate are discarded.

Estimating H from 4 correspondence pairs:

A homography is a 3×3 matrix with 8 degree of freedom (e.g., the number of values in the final calculation of a statistic that are free to vary):

$$H = \begin{bmatrix} h_{11} & h_{12} & h_{13} \\ h_{21} & h_{22} & h_{23} \\ h_{31} & h_{32} & 1 \end{bmatrix}$$

Hence, 4 pairs of points may be needed to estimate H. First, an affine transform A is determined from 3 pairs of points $(p_1, q_1)$, $(p_2, q_2)$, $(p_3, q_3)$, with p, and $q_i \in \mathbb{R}^2$ $$P = \begin{bmatrix} p_{1x} & p_{2x} & p_{3x} \\ p_{1y} & p_{2y} & p_{3y} \\ 1 & 1 & 1 \end{bmatrix} \quad Q = \begin{bmatrix} q_{1x} & q_{2x} & q_{3x} \\ q_{1y} & q_{2y} & q_{3y} \\ 1 & 1 & 1 \end{bmatrix} \quad A = QP^{-1}$$

Now an assumption is made that H is the product of a matrix B with matrix A:

$$H = BA$$

From the homography definition:
for $$i = 1, 2, 3: Hp_i = s_i q_i \text{ with } s_i = (Hp_i)_z = e_3^t Hp_i \text{ and } e_3 = \begin{bmatrix} 0 \\ 0 \\ 1 \end{bmatrix}$$

And from the affine transform definition:

$$Hp_i = BAp_i = BQP^{-1}p_i = Bq_i$$

Thus, the following relationship is true:

$$Bq_i = s_i q_i$$

Hence $q_1$, $q_2$, $q_3$ are eigenvectors of B, so B can be decomposed with the following:

$$B = Q\Lambda Q^{-1} \text{ with } \Lambda = \begin{bmatrix} \lambda_1 & 0 & 0 \\ 0 & \lambda_2 & 0 \\ 0 & 0 & \lambda_3 \end{bmatrix}$$

H therefore may be determined using the following:

$$H = BA = Q\Lambda Q^{-1} QP^{-1} = Q\Lambda P^{-1}$$

The next step is to find the eigenvalues $\lambda_i$ of B. For that the $4^{th}$ pair $(p_4, q_4)$ may be used:

$$Hp_4 = s_4 q_4 \Leftrightarrow Q\Lambda P^{-1} p_4 = s_4 q_4 \Leftrightarrow \Lambda P^{-1} p_4 = s_4 Q^{-1} q_4$$

The following definition may be used $\lambda_i = s_4 \{\overline{dk}\}_i$. Hence, the following is true in at least one embodiment:

$$\lambda_1 = s_4 \frac{(Q^{-1}q_4)_x}{(P^{-1}p_4)_x} \quad \lambda_2 = s_4 \frac{(Q^{-1}q_4)_y}{(P^{-1}p_4)_y} \quad \lambda_3 = s_4 \frac{(Q^{-1}q_4)_z}{(P^{-1}p_4)_z} \quad \text{And}$$

$$\gamma_1 = \frac{(Q^{-1}q_4)_x}{(P^{-1}p_4)_x} \quad \gamma_2 = \frac{(Q^{-1}q_4)_y}{(P^{-1}p_4)_y} \quad \gamma_3 = \frac{(Q^{-1}q_4)_z}{(P^{-1}p_4)_z}$$

Because the $\lambda_i$'s are defined up to a scalar $s_4$, $s_4$ may be ignored and H may be renormalized such that $h_{33}=1$:

$$\Lambda = s_4 \Gamma = s_4 \begin{bmatrix} \gamma_1 & 0 & 0 \\ 0 & \gamma_2 & 0 \\ 0 & 0 & \gamma_3 \end{bmatrix} \Rightarrow F = Q\Gamma P^{-1} \text{ and } H = \frac{1}{f_{33}} F$$

Estimating H from Inlier Correspondence Pairs:

Once an estimated H is determined from 4 pairs, $\Lambda$ is minimized in a least square sense such that the following is true:

$$\Lambda^* = \operatorname*{argmin}_{\Lambda} \sum_i \| Q\Lambda P^{-1} p_i - (e_3^t Q\Lambda P^{-1} p_i) q_i \|^2$$

A last step can be done using a Levenberg-Marquardt optimization (e.g., damped least-squares (DLS) method that may be used to solve non-linear least squares problems).

FIGS. 7A and 7B illustrate front and back views, respectively, of an example electronic computing device 700 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 700 has a display screen 702 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 704 on the front of the device and at least one image capture element 710 on the back of the device. It should be understood, however, that image capture elements could also, or alternatively, be placed on the sides or corners of the device, and that there can be any appropriate number of capture elements of similar or different types. Each image capture element 704 and 710 may be, for example, a camera, a charge-coupled device (CCD), a motion detection sensor or an infrared sensor, or other image capturing technology.

As discussed, the device can use the images (e.g., still or video) captured from the imaging elements 704 and 710 to generate a three-dimensional simulation of the surrounding environment (e.g., a virtual reality of the surrounding environment for display on the display element of the device). Further, the device can utilize outputs from at least one of the image capture elements 704 and 710 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 708 on the front side, one microphone 712 on the back, and one microphone 706 on or near a top or side of the device. In some devices there may be only one microphone, while in other devices there might be at least one microphone on each side and/or corner of the device, or in other appropriate locations.

The device 700 in this example also includes one or more orientation- or position-determining elements 718 operable to provide information such as a position, direction, motion, or orientation of the device. These elements can include, for example, accelerometers, inertial sensors, electronic gyroscopes, and electronic compasses.

The example device also includes at least one computing mechanism 714, such as may include at least one wired or wireless component operable to communicate with one or more electronic devices. The device also includes a power system 716, such as may include a battery operable to be recharged through conventional plug-in approaches, or through other approaches such as capacitive charging through proximity with a power mat or other such device. Various other elements and/or combinations are possible as well within the scope of various embodiments.

FIG. 8 illustrates a set of basic components of an electronic computing device 800 such as the device 700 described with respect to FIGS. 7A and 7B. In this example, the device includes at least one processing unit 802 for executing instructions that can be stored in a memory device or element 804. As would be apparent to one of ordinary skill in the art, the device can include many types of memory, data storage, or computer-readable media, such as a first data storage for program instructions for execution by the processing unit(s) 802, the same or separate storage can be used for images or data, a removable memory can be available for sharing information with other devices, and any number of computing approaches can be available for sharing with other devices.

The device typically will include some type of display element 806, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 808, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 800 also includes at least one orientation determining element 810 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 800. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 812 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 814 operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 818 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 9:
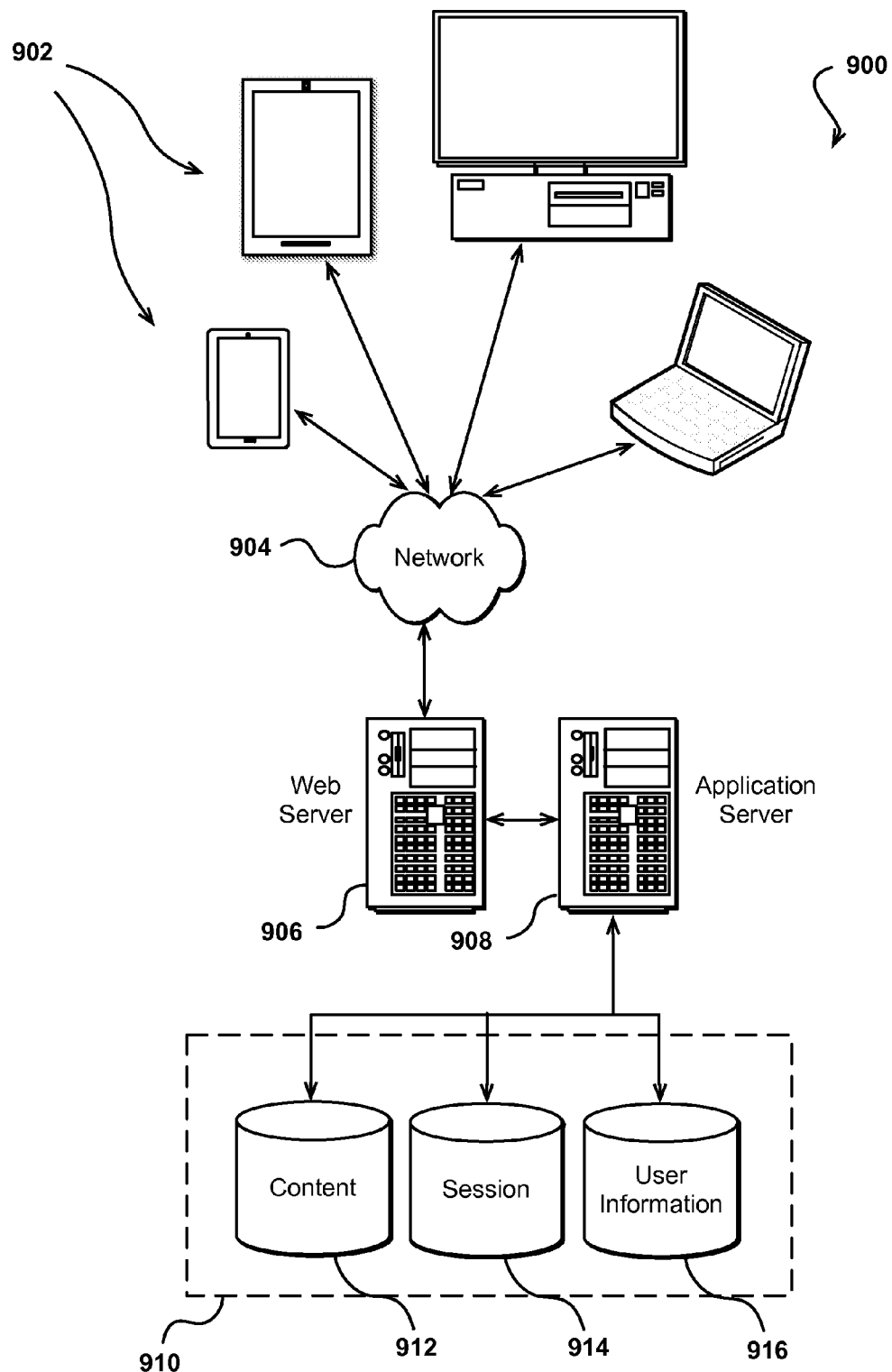
FIG. 9 illustrates an example of an environment for implementing aspects in accordance with various embodiments of the subject technology.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Computing over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, the method comprising:
   identifying a candidate corner feature in a first image, the candidate corner feature including a set of pixels from the first image;
   determining a center pixel from the set of pixels;
   selecting, from the set of pixels, a subset of pixels, each pixel from the subset of pixels being at a respective distance from the center pixel, wherein the subset of pixels comprises a ring shape that surrounds the center pixel;
   downscaling the set of pixels from the first image, the downscaled set of pixels representing a second layer of a pyramid and the set of pixels representing a bottom layer of the pyramid;
   determining a first derivative value based at least in part on of a weighted sum of intensities of respective pixels from a right side of the downscaled set of pixels and intensities of respective pixels from the left side of the downscaled set of pixels;
   determining a second derivative value based at least in part on of a second weighted sum of intensities of respective pixels from an upper side of the downscaled set of pixels and intensities of respective pixels from a bottom side of the downscaled set of pixels;
   determining an orientation angle using at least an arctangent function on the first and second derivative values;
   shifting values of a subset of pixels from the downscaled set of pixels based at least in part on the orientation angle, the subset of pixels comprising a ring that surrounds a respective center pixel of the downscaled set of pixels; and
   confirming a corner feature of the first image based at least in part on:
      determining that intensities of at least a pair of pixels are not within a threshold value of the intensity of the center pixel; and
      determining that an intensity of a first pixel from the at least the pair of pixels is unequal to an intensity of a second pixel from the at least the pair of pixels; and
   providing the confirmed corner feature to at least one object recognition process.

2. The computer-implemented method of claim 1, further comprising;
   downscaling the set of pixels from the first image, the downscaled set of pixels representing a second layer of a pyramid and the set of pixels representing a bottom layer of the pyramid, the second layer of the pyramid having a greater radius than the bottom layer of the pyramid;
   generating, using at least in part the set of pixels from the first image, a plurality of rings of pixels, each ring of pixels representing a successive downscaled image of the set of pixels and a successive layer of a pyramid; and
   generating a vector of values based at least in part on respective intensity values for each pixel from the plurality of rings of pixels.

3. The computer-implemented method of claim 2, further comprising:
   generating a forest of tree data structures for a set of descriptor values from the first image based on the vector of values; and
   determining, for set of descriptor values of a second image, a set of nearest neighbors from the first image based at least in part on the forest of tree data structures.

4. A system comprising:
   at least one processor; and
   a memory device including instructions that, when executed by the at least one processor, cause the at least one processor to:
   identify a candidate corner feature in a first image, the candidate corner feature including a set of pixels from the first image;
   determine a center pixel from the set of pixels;
   select, from the set of pixels, a subset of pixels, each pixel from the subset of pixels being at a respective distance from the center pixel;
   determine a corner feature of the first image based at least in part on comparing an intensity of the center pixel to intensities of at least a pair of pixels from the subset of pixels;
   downscale the set of pixels from the first image, the downscaled set of pixels representing an outer layer of a pyramid and the set of pixels representing an inner layer of the pyramid, the outer layer having a greater radius than the inner layer;
   determine a first derivative value based at least in part on of a weighted sum of intensities of respective pixels from a right side of the downscaled set of pixels and intensities of respective pixels from the left side of the downscaled set of pixels;
   determine a second derivative value based at least in part on of a second weighted sum of intensities of respective pixels from an upper side of the downscaled set of pixels and intensities of respective pixels from a bottom side of the downscaled set of pixels;
   determine an orientation angle using at least an arctangent function on the first and second derivative values; and
   shift values of a subset of pixels from the downscaled set of pixels based at least in part on the orientation angle, the subset of pixels comprising a ring that surrounds a respective center pixel of the downscaled set of pixels.

5. The system of claim 4, wherein the subset of pixels includes sixteen pixels, the sixteen pixels comprising a ring shape that surrounds the center pixel.

6. The system of claim 4, wherein to determine the corner feature of the first image further causes the at least one processor to:
determine that an intensity of the at least the pair of pixels is not within a threshold value of the intensity of the center pixel.

7. The system of claim 6, wherein the instructions further cause the at least one processor to:
select a second pair of pixels from the subset of pixels, the second pair of pixels being different than the at least the pair of pixels; and
determine that intensities of the second pair of pixels are not within the threshold value of the intensity of the center pixel.

8. The system of claim 6, wherein the instructions further cause the at least one processor to:
determine that an intensity of a first pixel from the at least the pair of pixels is unequal to an intensity of a second pixel from the at least the pair of pixels.

9. The system of claim 4, wherein the instructions further cause the at least one processor to:
downscale the set of pixels from the first image, the downscaled set of pixels representing a second layer of a pyramid and the set of pixels representing a bottom layer of the pyramid, the second layer of the pyramid having a greater radius than the bottom layer of the pyramid;
generate, using at least in part the set of pixels from the first image, a plurality of rings of pixels, each ring of pixels representing a successive downscaled image of the set of pixels and a successive layer of a pyramid; and
generate a vector of values based at least in part on respective intensity values for each pixel from the plurality of rings of pixels.

10. The system of claim 9, wherein the instructions further cause the at least one processor to:
generate a forest of tree data structures for a set of descriptor values from the first image based on the vector of values.

11. The system of claim 10, wherein the instructions further cause the at least one processor to:
determine, for set of descriptor values of a second image, a set of nearest neighbors from the first image based at least in part on the forest of tree data structures.

12. A non-transitory computer-readable medium including instructions stored therein that, when executed by at least one computing device, cause the at least one computing device to:
identify a candidate corner feature in a first image, the candidate corner feature including a set of pixels from the first image;
determine a center pixel from the set of pixels;
select, from the set of pixels, a subset of pixels, each pixels from the subset of pixels being at a respective distance from the center pixel;
determine a corner feature of the first image based at least in part on comparing an intensity of the center pixel to intensities of at least a pair of pixels from the subset of pixels;
downscale the set of pixels from the first image, the downscaled set of pixels representing an outer layer of a pyramid and the set of pixels representing a bottom layer of the pyramid, the outer layer having a greater radius than the bottom layer of the pyramid;
determine a first derivative value based at least in part on of a weighted sum of intensities of respective pixels from a right side of the downscaled set of pixels and intensities of respective pixels from the left side of the downscaled set of pixels;
determine a second derivative value based at least in part on of a second weighted sum of intensities of respective pixels from an upper side of the downscaled set of pixels and intensities of respective pixels from a bottom side of the downscaled set of pixels;
determine an orientation angle using at least an arctangent function on the first and second derivative values; and
shift values of a subset of pixels from the downscaled set of pixels based at least in part on the orientation angle, the subset of pixels comprising a ring that surrounds a respective center pixel of the downscaled set of pixels.

13. The non-transitory computer-readable medium of claim 12, wherein to determine the corner feature of the first image further causes the at least one computing device to:
determine that intensities of the at least the pair of pixels are not within a threshold value of the intensity of the center pixel.

14. The non-transitory computer-readable medium of claim 13, wherein the instructions further cause the at least one computing device to:
select a second pair of pixels from the subset of pixels, the second pair of pixels being different than the at least the pair of pixels; and
determine that intensities of the second pair of pixels are not within the threshold value of the intensity of the center pixel.

15. The non-transitory computer-readable medium of claim 12, wherein the instructions further cause the at least one computing device to:
downscale the set of pixels from the first image, the downscaled set of pixels representing a second layer of a pyramid and the set of pixels representing a bottom layer of the pyramid, the second layer having a greater radius than the bottom layer of the pyramid;
generate, using at least in part the set of pixels from the first image, a plurality of rings of pixels, each ring of pixels representing a successive downscaled image of the set of pixels and a successive layer of a pyramid;
generate a vector of values based at least in part on respective intensity values for each pixel from the plurality of rings of pixels; and
generate a forest of tree data structures for a set of descriptor values from the first image based on the vector of values.

16. The non-transitory computer-readable medium of claim 15, wherein the instructions further cause the at least one computing device to:
determine, for set of descriptor values of a second image, a set of nearest neighbors from the first image based at least in part on the forest of tree data structures.

17. The non-transitory computer-readable medium of claim 15, wherein the intensity values comprise an 8-bit value within a range of 0 to 255.

18. The system of claim 9, wherein the intensity values comprise an 8-bit value within a range of 0 to 255.

19. The non-transitory computer-readable medium of claim 12, wherein the subset of pixels includes sixteen pixels, the sixteen pixels comprising a ring shape that surrounds the center pixel.

20. The non-transitory computer-readable medium of claim 13, wherein the instructions further cause the at least one computing device to:
   determine that an intensity of a first pixel from the at least the pair of pixels is unequal to an intensity of a second pixel from the at least the pair of pixels.

\* \* \* \* \*